United States Patent
Eguchi

(10) Patent No.: US 7,260,239 B2
(45) Date of Patent: Aug. 21, 2007

(54) INFORMATION PROCESSING METHOD AND INFORMATION PROCESSOR

(75) Inventor: Takami Eguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 690 days.

(21) Appl. No.: 10/857,049

(22) Filed: May 28, 2004

(65) Prior Publication Data

US 2004/0247155 A1    Dec. 9, 2004

(30) Foreign Application Priority Data

Jun. 3, 2003    (JP)    ............................ 2003-158596
Mar. 23, 2004  (JP)    ............................ 2004-085348

(51) Int. Cl.
*G06K 9/00*    (2006.01)

(52) U.S. Cl. ..................................... 382/100

(58) Field of Classification Search ................ 382/100, 382/176, 177, 290, 291, 292, 232; 713/176; 715/530, 531, 539; 380/54, 51, 55
See application file for complete search history.

(56) References Cited

U.S. PATENT DOCUMENTS 7,190,807 B2 *  3/2007  Tamaru et al. .............. 382/100
2003/0149936 A1 *  8/2003  Tamaru ....................... 715/515
2004/0142096 A1 *  7/2004  Iwamura et al. ................ 427/7

OTHER PUBLICATIONS

Nopporn Chotikakamthorn,"Electronic Document Data Hiding Technique using Inter-Character Space", "IEEE", P419-422.

* cited by examiner

*Primary Examiner*—Joseph Mancuso
*Assistant Examiner*—Claire Wang

(57)    ABSTRACT

An information hiding system such as a digital-watermark information system has an embedding side and an extracting side for recognizing an identical character string in which digital-watermark information is embedded, and the extracting side reliably extracts all digital-watermark information from the character string. In order to realize this, an image processing method of the present invention includes a determining step of determining whether a predetermined distance between each target character and an adjoining character can be maintained if any digital-watermark information which may be embedded in the target character is actually embedded; and a setting step of setting an object which is to be embedded with digital-watermark information according to the determination result.

14 Claims, 13 Drawing Sheets

FIG. 13

| CIRCUMSCRIBED RECTANGLE | POSITION | SIZE | DISTANCE INFORMATION | DETERMINATION RESULT | COORDINATE AFTER MOVEMENT |
|---|---|---|---|---|---|
| (1, 1) | X11,Y11 | W11,H11 | — | — | — |
| (1, 2) | X12,Y12 | W12,H12 | — | — | — |
| (1, 3) | X13,Y13 | W13,H13 | — | — | — |
| .. | .. | .. | .. | .. | .. |
| (2, 1) | X21,Y21 | W21,H21 | — | — | — |
| (2, 2) | X22,Y22 | W22,H22 | L22,R22,Sr22,Sl22 | OK | X22' |
| (2, 3) | X23,Y23 | W23,H23 | — | — | — |
| (2, 4) | X24,Y24 | W24,H24 | L24,R24,Sr24,Sl24 | OK | X24' |
| .. | .. | .. | .. | .. | .. |
| (i, j−1) | Xij−1,Yij−1 | Wij−1,Hij−1 | — | — | — |
| (i, j) | Xij,Yij | Wij,Hij | Lij,Rij,Srij,Slij | — | — |
| (i, j+1) | Xij+1,Yij+1 | Wij+1,Hij+1 | — | — | — |
| .. | .. | .. | .. | .. | .. |

INFORMATION PROCESSING METHOD AND INFORMATION PROCESSOR

BACKGROUND OF THE INVENTION

1. Field of the Invention

The present invention relates generally to an information processing method, information processor, computer program, and storage medium for storing the program, and more specifically to an information processing method for hiding information to protect digital data, and an information processor, computer program and storage medium for same.

2. Description of the Related Art

Under the recently promoted standard for digitization of text, image and voice data, prevention of illegal copying of digital data and association of digital data with metadata are required.

For document images on printed materials, digital data and printed material are combined. And so, in order to protect such combined digital data, the access control system must be capable of linking both the digital data and printed material. Under these circumstances, information-hiding techniques such as digital-watermark information embedding have been employed.

In digital-watermark information embedding, part of original data is modified so that it is imperceptible to a human being, additional information is then embedded in the image, voice, or text data.

Specifically, when digital-watermark embedding is applied to multi-valued images, redundancy of pixel density is employed. However, since binary images such as document images have little or no redundancy, digital-watermark embedding is difficult to apply. In view of this problem, other methods that use characteristics peculiar to document images have been proposed.

These methods include moving the baseline of lines, modifying the length of spaces between words, modifying inclination of characters by rotating them, and modifying the length of spaces between characters. By such minimal modification, additional information can be embedded in a document image.

As a specific example, a method for modifying the length of space between characters is described with reference to FIGS. 9 and 10.

FIG. 9 shows part of a document image before digital-watermark information is embedded therein. FIG. 10 shows part of the document image after digital-watermark information has been embedded in part of the document image shown in FIG. 9. Space lengths P0, S0, P1, and S1 between characters in FIG. 9 are changed to space length P0', S0', P1', and S1' shown in FIG. 10 by embedding digital-watermark information therein. In FIGS. 9 and 10, five characters and four spaces between them are shown. In this case, two spaces are allocated to 1 bit, and thus four spaces can be embedded with two bits.

For example, P>S represents "1" and P<S represents "0". In this state, if the character between P0 and S0 is shifted to the left and the character between P1 and S1 is shifted to the left in FIG. 9, P0'<S0' and P1'<S1' are satisfied in FIG. 10, which shows part of the document image after embedding. Accordingly, a bit string (2 bits) of "1" and "0" can be embedded.

The above-described method for modifying the length of space between characters is disclosed in, for example, "Electronic document data hiding technique using inter-character space", The 1998 IEEE Asia-Pacific Conf. On Circuits and Systems, 1998, pp. 419-422, by King Mongkut University.

In such digital-watermark information embedding, information cannot be embedded in some portions of the document due to the positions of circumscribed rectangles. For example, as shown in FIG. 11, when the length of each of P and S is 1 pixel, the circumscribed rectangle can neither be moved to the right nor the left because the rectangle would contact the adjoining rectangle.

In such a case, the watermark extracting side cannot determine whether this portion of the document contains embedded digital-watermark information or whether it contains the original unmodified portion in which information cannot be embedded.

That is, in the known art, it is difficult for both the embedding and extracting sides to recognize the same character string, which includes digital-watermark information.

SUMMARY OF THE INVENTION

The present invention has been made in view of the above-described known art, and one aspect of the present invention provides a method in which both embedding and extracting sides can recognize the same character string embedded with digital-watermark information and in which the extracting side can reliably extract all digital-watermark information from the character string.

The present invention provides an information processing method for embedding digital-watermark information by moving target characters in a character string arranged in a predetermined direction to the predetermined direction. The method includes: a determining step of determining whether a predetermined distance between each target character and an adjoining character can be maintained if any digital-watermark information which may be embedded in the target character is actually embedded; a setting step of setting the target character as an object which is to be embedded with digital-watermark information if the determining step determines that the predetermined distance can be maintained, and setting the target character as an object which is not to be embedded with digital-watermark information if the determining step determines that the predetermined distance cannot be maintained; and an adjusting step of adjusting the position of the target character set as an object which is to be embedded with digital-watermark information in the setting step, based on the digital-watermark information.

Further features and advantages of the present invention will become apparent from the following description of the embodiments with reference to the attached drawings.

BRIEF DESCRIPTION OF THE DRAWINGS

FIG. 13 shows an example of a table.

DETAILED DESCRIPTION OF THE INVENTION

Hereinafter, embodiments of the present invention will be described.

<1. Configuration of Information Processor and Outline of Information Processing>

Figure 12:
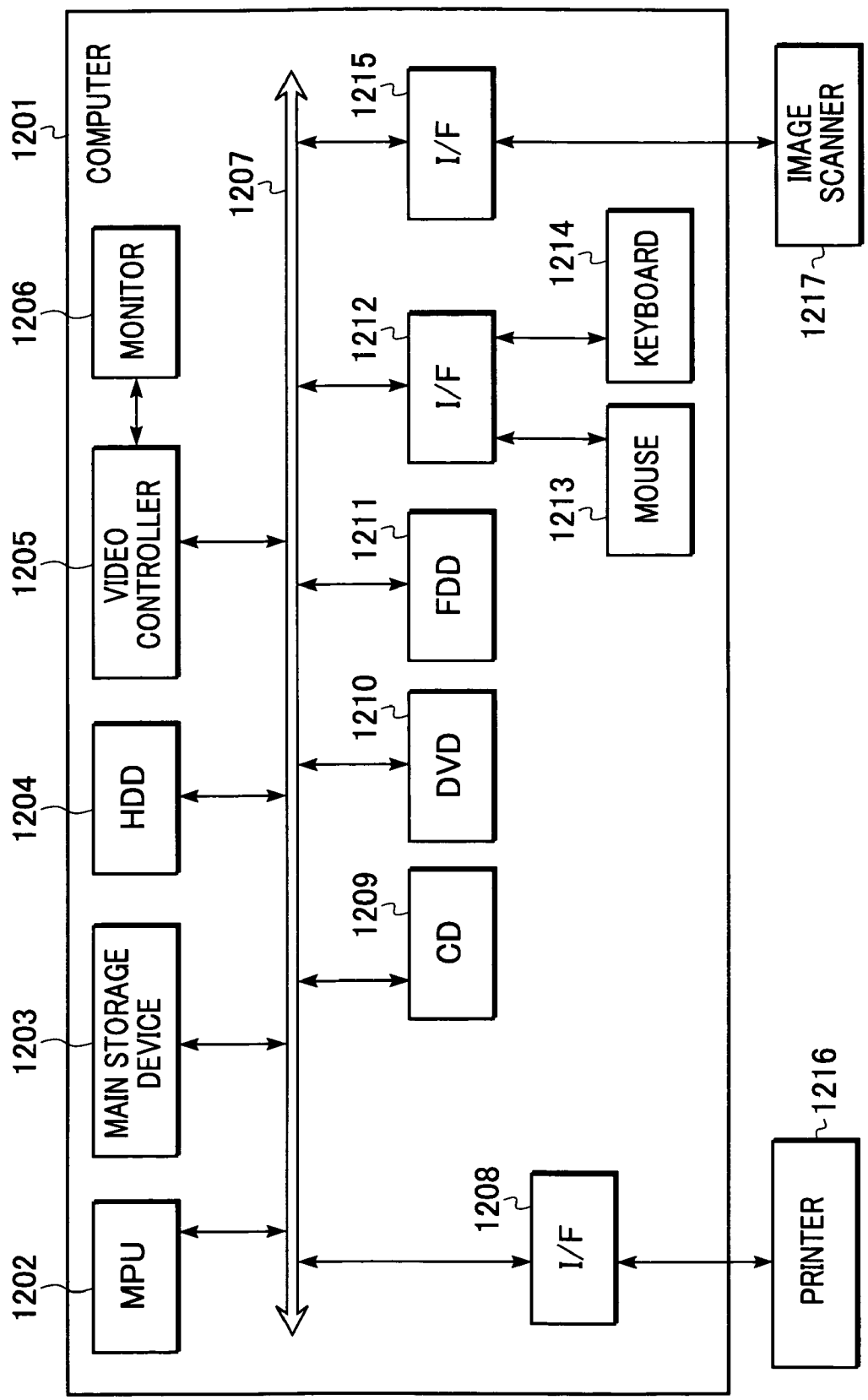
FIG. 12 shows the configuration of an information processor.

FIG. 12 shows an information processor for embedding and extracting digital-watermark information according to an embodiment. In this figure, a computer 1201 such as personal computer (PC) is used as the information processor. Hereinafter, the internal configuration thereof will be described.

The computer 1201 includes an MPU 1202 for controlling the entire system; and a main storage device 1203 including ROM storing BIOS and a boot program and RAM. An OS and various applications are loaded on the RAM in the main storage device 1203, so as to be executed.

Also, the computer 1201 includes a hard disk device (HDD) 1204 for storing the OS, various applications, and data files; and a video controller 1205 including a video memory. The video controller 1205 expands bit-mapped images to be displayed and reads the expanded bit-mapped images so as to output them as video signals to a monitor 1206 under the control by the MPU 1202.

Also, the computer 1201 includes a system bus 1207 for connecting the above-described and following devices; an interface (I/F) 1208 for connecting a printer 1216 to the system bus 1207; a CD-ROM drive 1209; a DVD drive 1210; a floppy disk drive 1211; a mouse 1213; an interface (I/F) 1212 for connecting a keyboard 1214; and an interface (I/F) 1215 for connecting an image scanner 1217.

In this configuration, when the computer 1201 is turned on, the MPU 1202 loads the OS from the HDD 1204 to the RAM in accordance with the boot program in the ROM in the main storage device 1203, and also loads a program used for embedding or extracting digital-watermark information to the RAM, so as to realize each function.

Figure 1:
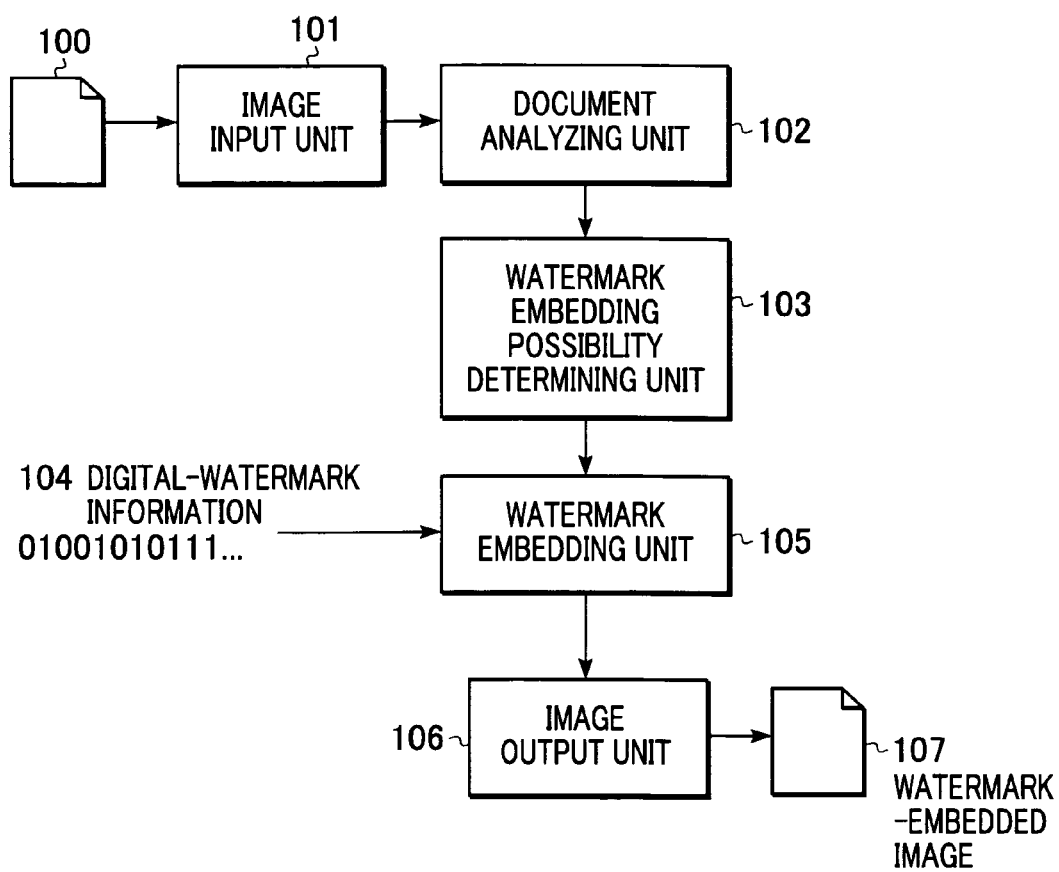
FIG. 1 shows components of a digital watermark embedding system for embedding digital watermark information into a document image in accordance with an embodiment of the present invention.

FIG. 1 shows components of a digital watermark embedding system for embedding digital-watermark information into a document image 100.

When the original document image 100 is set on the image scanner 1217 (FIG. 12), an image input unit 101 reads the image 100 and generates digital image data representing this image.

A document analyzing unit 102 detects the number of black dots (significant dots) in the horizontal direction of the image data, and extracts the line of each character based on a histogram indicating the number of black dots. Further, the document analyzing unit 102 detects the number of black dots in the vertical direction of the image data in each line, and determines the position and size (width in the horizontal direction and height in the vertical direction of each circumscribed rectangle) of each character image (consisting of a plurality of pixels representing a character) based on the histogram indicating the number of black dots. The method for detecting circumscribed rectangles is further described with reference to step S302 of FIG. 3. Then, the document analyzing unit 102 outputs the image data and information about each determined position and size to a watermark embedding possibility determining unit (hereinafter referred to as determining unit) 103 in the subsequent stage.

The determining unit 103 determines whether digital-watermark information (1-bit information forming digital-watermark information) can be embedded by moving a target character based on the position and size of the target character image and the neighboring character images. Then, the determining unit 103 outputs the image data, the information about each determined position and size, the determination result (the position of a character to which watermark can be embedded), and other information (information about length). All of this information from the determining unit 103 is output to a watermark embedding unit 105 in the subsequent stage.

The watermark embedding unit 105 embeds prepared digital-watermark information 104 (for example, a character code indicating the name of a copyright holder) in the image data based on each piece of the information received from the determining unit 103, and outputs the result (image data embedded with digital-watermark information) to an image output unit 106.

The image output unit 106 outputs the result (image data embedded with digital-watermark information) as image data 107 for one frame. The image data 107 may be stored in a storage device or storage medium (CD-R or CD-R/W) in form of an electronic file, or may be output to a network through a network interface (not shown). Of course, the image data 107 may be sent to the printer 1216 so as to generate a visible image.

Figure 2:
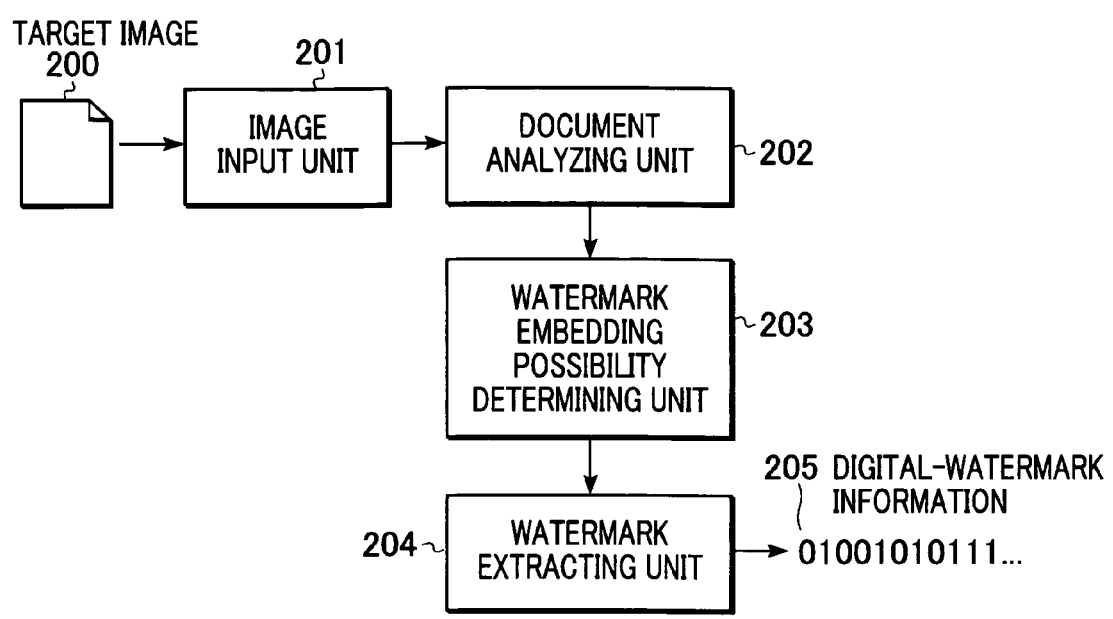
FIG. 2 shows components of a digital watermark extracting system for extracting digital watermark information from a document image in accordance with an embodiment of the present invention.

FIG. 2 shows extraction of digital-watermark information embedded in the image data 107 by the information processor of this embodiment.

First, a target image 200 is input through an image input unit 201. The image 200 may be an image read by the image scanner, an image read from a storage medium such as a CD-ROM, or an image received through a network.

A document analyzing unit 202 analyzes contents of the image 200 and recognizes each line as well as each character (character image) in the line.

Then, a watermark embedding possibility determining unit (hereinafter referred to as determining unit) 203 then determines whether digital-watermark information (1-bit digital-watermark information) is embedded by moving a target character based on the position and size of the target character image and the neighboring character images. If the watermark information is embedded, the determining unit 203 outputs information required for extracting the digital-watermark information to a watermark extracting unit 204 in the subsequent stage.

The watermark extracting unit 204 extracts digital-watermark information 205 from the input image data based on various information received from the determining unit 203.

The digital-watermark information 205 is extracted in units of embedded bits and is output one bit after another. However, if the embedded digital-watermark information (bit string) is bit information forming character codes, the other character codes (codes representing a hidden character string which is not necessarily associated with a character string visibly displayed in the document image 200) are sequentially extracted and output eventually.

Characters represented by the extracted bit string or extracted character code is output to a medium, which may be a display or printed material. Preferably, in this case, the characters are output together with the input document image 200.

<2. Process of Embedding Digital-Watermark Information>

Figure 3:
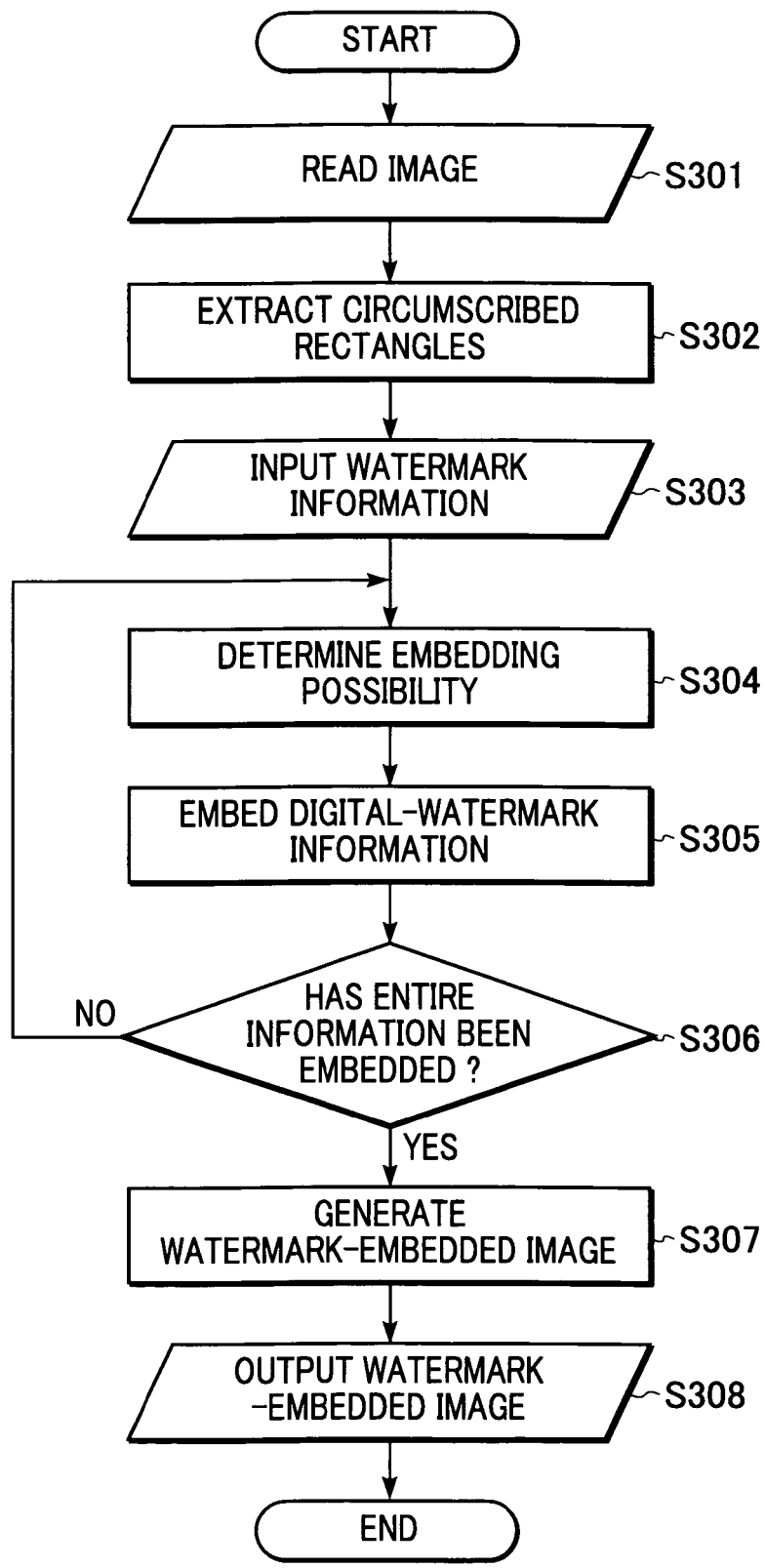
FIG. 3 is a flowchart showing the process of embedding digital-watermark information.

Next, a process of embedding the digital-watermark information 104 according to the present embodiment will be described with reference to FIG. 3. FIG. 3 is a flowchart for illustrating the operation of the digital-watermark information embedding system (information processor) for documents. This flowchart provides further details about the process described with reference to step S302, below.

First, in step S301, the document image 100 in which the digital-watermark information 104 is to be embedded is input through the image input unit 101 (for example, the scanner 1217 in FIG. 12). Then, image data representing the document image 100 is input to the document analyzing unit 102.

The document image 100 may be printed material input through the scanner 1217 or electronic data created by using a document editing application program. Alternatively, electronic data in text form or in a form peculiar to various application programs may be converted to a bitmap by image processing software. Further, electronic data stored in a storage medium connected to the hard disk drive 1204, the CD drive 1209, the DVD drive 1210, or the FD drive 1211 may be used.

Then, in step S302, the document analyzing unit 102 analyzes contents of the input document image. In this step, the position and size of each rectangle circumscribing a character image are extracted from the input document image.

A process for extracting the position of each character image and for extracting the rectangle circumscribing each character is as follows. In general, the number of significant pixels (black pixels) in the document image is counted in the main scanning direction so as to create a histogram for each pixel line, and main scanning lines where no black pixels exist (blank portions) are detected so as to recognize each line. Then, the number of significant pixels is counted in the sub scanning direction in each line so as to create a histogram for each pixel row, and sub-scanning lines where no black pixels exist (blank portions) are detected so as to recognize each character (character image). Accordingly, the circumscribed rectangle of each character (position of each character and size of rectangle) can be specified.

In step S303, the digital-watermark information 104 to be embedded is input. The digital-watermark information 104 may be input through the keyboard 1214. Alternatively, the digital-watermark information may be stored in advance in a storage device in a form of digital-watermark information file, and the file may be read and input by specifying it. The digital-watermark information 104 can be a bit string including "1" or "0" that may be input one bit after another, or a character code including several bits that may be input through the keyboard or the like.

Then, in step S304, it is determined whether digital-watermark information can be embedded (corresponding to the determining unit 103 in FIG. 1) in a target character, which has not been embedded with watermark (target character which has not been determined in step S304). In other words, a target character, which can be embedded with digital-watermark information, is specified. Then, in step S305, digital-watermark information (1-bit digital-watermark information) is embedded in the character (rectangle) determined to be a character, which can be embedded with digital-watermark information by the watermark embedding unit 105 shown in FIG. 1.

In step S306, it is determined whether the entire bit information to be embedded as the digital-watermark information 104 has been embedded in the image data representing the document image 100. If all the bits have been embedded, the process proceeds to step S307. If all the bits have not been embedded yet, the process returns to step S304.

Hereinafter, an algorithm for embedding digital-watermark information in accordance with step S304 and step S305 is described as follows.

<2-1. Algorithm for Embedding Digital-Watermark Information>

Embedding of digital-watermark information in this embodiment is performed by moving each target character and referencing neighboring characters, which are not moved.

Figure 8:
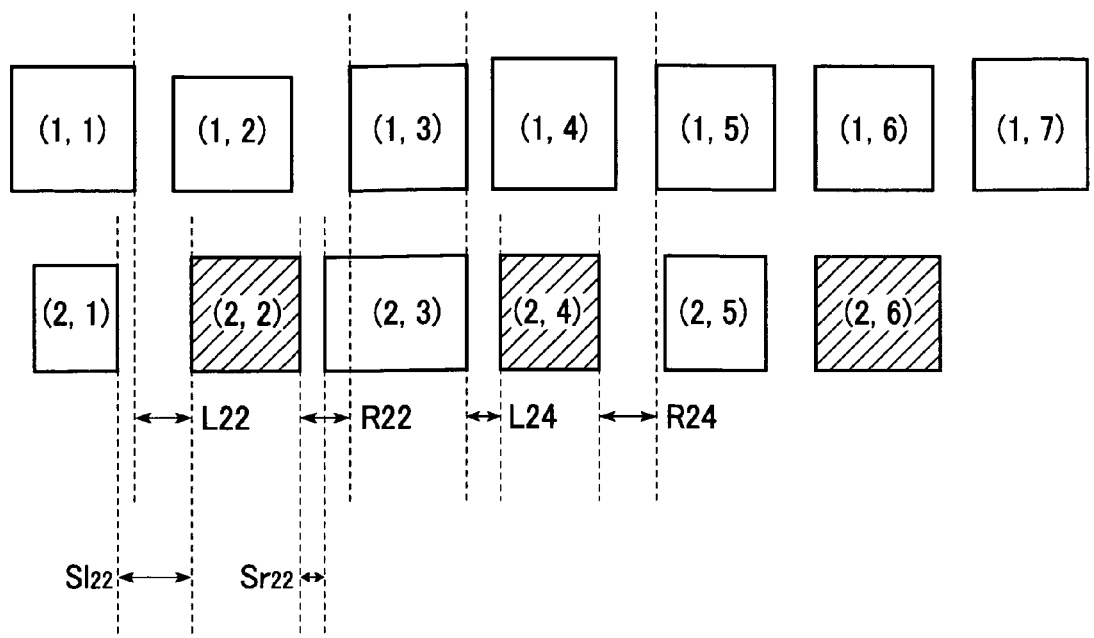
FIG. 8 illustrates the principle of embedding of digital-watermark information.

FIG. 8 schematically illustrates an embedding method of this embodiment. In the figure, each rectangle indicated by (i, j) is a circumscribed rectangle for each character image. In this case, i is a parameter indicating the position of a line and j is a parameter indicating the position of a row.

In this embodiment, characters which may be moved for embedding digital-watermark information, that is, target circumscribed rectangles (2, 2), (2, 4), . . . , and (2, 2n) in the second line (n=1, 2, . . . ) are predetermined. In this embodiment, it is determined whether digital-watermark information can be embedded in each of these rectangles (character images), in other words, it is determined whether each of the rectangles can be moved.

In this embodiment, all the rectangles in the first line (1, n) serve as an anchor point and are not moved. Also, in the second line including the target rectangles, odd-numbered rectangles (2, 1), (2, 3), . . . , and (2, 2n−1) serve as an anchor point and are not moved. Likewise, in the rectangles (character images) in the third line, even-numbered rectangles (3, 2), (3, 4), . . . , and (3, 2n) are regarded as target rectangles (rectangles which may be moved), and odd-numbered rectangles (3, 1), (3, 3), . . . , and (3, 2n−1) serve as an anchor point, as in the second line. In the fourth line and thereafter, target rectangles and an anchor point are set in the same manner as in the second line. Each rectangle serving as an anchor point remains at the same position in a document image irrespective of whether digital-watermark information is embedded or not.

In the digital-watermark information embedding of this embodiment, the circumscribed rectangle (2, 2) is first examined. As shown in FIG. 8, the left side distance between the rectangles (2, 2) and (1, 1) is defined as L22 and the right side distance between the rectangles (2, 2) and (1, 3) is defined as R22. The length between the two distances is modified so as to embed digital-watermark information. Note that in general, the left-direction distance in a target rectangle along the x coordinate is defined as Lx and the right-direction distance is defined as Rx.

For example, when a bit "1" is to be embedded, the target rectangle (2, 2) is horizontally moved so that L22>R22 is satisfied. When bit "0" is to be embedded, the target rectangle is moved so that L22<R22 is satisfied.

Based on the above-described manner of movement, the other target circumscribed rectangles (2, 4), (2, 6), . . . , (2, 2n), . . . , (3, 2n), . . . , (4, 2n), . . . are moved only when 1-bit information can be embedded therein, so as to sequentially embed pieces of 1-bit information "1" or "0" forming the digital-watermark information 104.

<2-2. Algorithm for Determining Whether Digital-Watermark Information can be Embedded in an Image Document>

Hereinafter, the operation of the determining unit 103 performed in step S304 will be described in detail. In this embodiment, before embedding digital-watermark information, the determining unit 103 determines whether a circumscribed rectangle to be moved (for example, rectangle (2, 2)) can be embedded with digital-watermark information.

Figure 5:
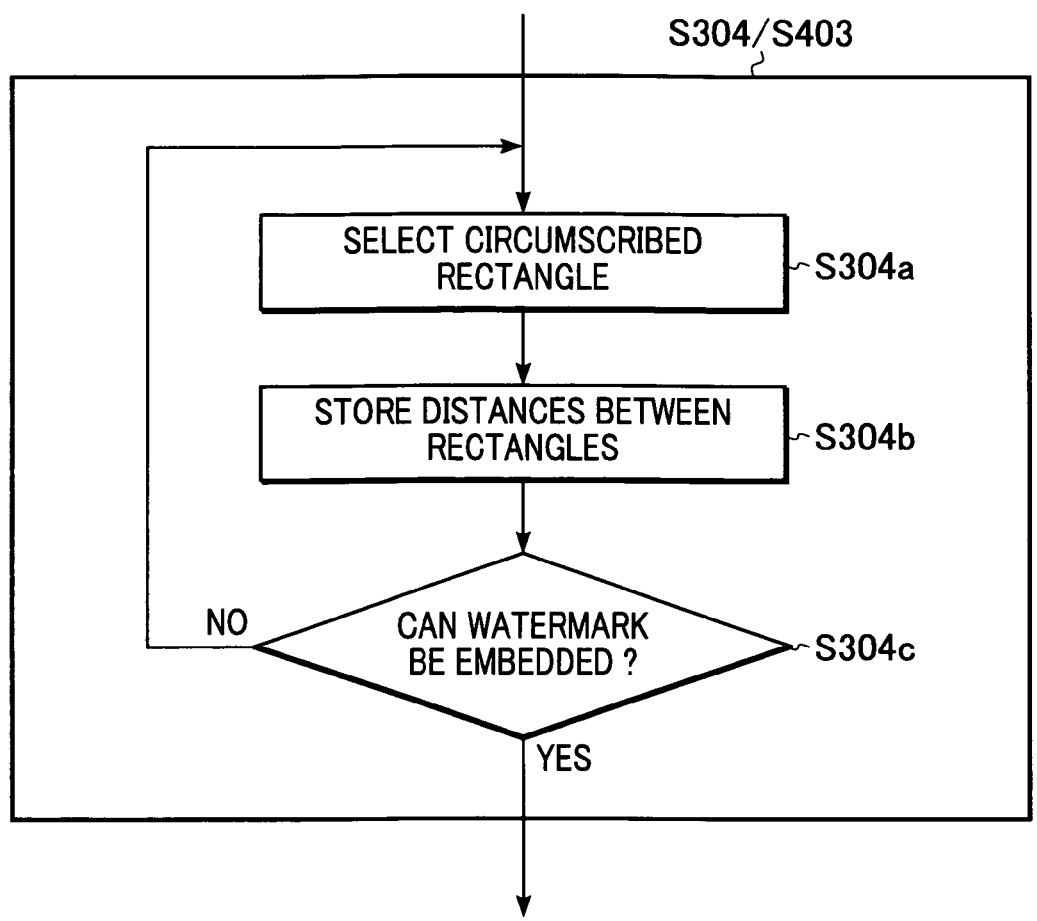
FIG. 5 is a flowchart showing a process to determine whether digital-watermark information can be embedded in a document.

FIG. 5 is a flowchart showing a specific procedure of the determining unit 103 of this embodiment. This procedure will be described below.

First, in step S304a, a circumscribed rectangle (for example, rectangle (2, 2)), which may be moved to embed digital-watermark information, is selected.

Then, in step S304b, the distances L22 and R22, and Sr22 and S122 indicating the distances between the target rectangle (2, 2) and the adjoining rectangles (2, 1) and (2, 3) on the same line are calculated and stored.

Herein, Sr22 is the distance in the horizontal direction between the target circumscribed rectangle (2, 2) and the circumscribed rectangle (2, 3) on its right, and is a maximum movement distance in the right direction for the target rectangle. (In general, a maximum movement distance in the right direction for a target rectangle in the x coordinate is defined as Srx.)

Likewise, S122 is the distance in the horizontal direction between the target circumscribed rectangle (2, 2) and the circumscribed rectangle (2, 1) on its left, and is a maximum movement distance in the left direction for the target rectangle. (In general, a maximum movement distance in the left direction for a target rectangle in the x coordinate is defined as Slx.) The two distances are stored in the main storage device 1203.

Then, in step S304c, it is determined whether digital-watermark information can be embedded. If either "0" or "1" cannot be embedded, then digital-watermark information is not embedded in a current target rectangle. That is, the embedding process is skipped.

For example, assume that digital-watermark information (bit information) "1" is to be embedded in the current target rectangle. In this case, the target rectangle must be moved so that L22>R22 is satisfied. However, if L22>R22 cannot be satisfied even by moving the target rectangle to the maximum extent, digital-watermark information cannot be embedded. This condition where "1" cannot be embedded satisfies the Expression:

$$Lx+Srx \leq Rx-Srx$$ (Expression 1).

By using Expression 1, the circumscribed rectangle (2, 2) can be expressed as follows:

$$L22+Sr22 \leq R22-Sr22.$$

Likewise, the condition where "0" cannot be embedded satisfies the Expression:

$$Lx-Slx \geq Rx+Slx$$ (Expression 2).

By using Expression 2, the circumscribed rectangle (2, 2) can be expressed as follows:

$$L22-Sl22 \geq R22+Sl22.$$

For example, when the condition of Expression 1 is satisfied, L22<R22 is satisfied. Therefore, when information to be embedded is "0", the information "0" can be unconditionally embedded. However, if this circumscribed rectangle is regarded as a target for embedding, the watermark extracting side cannot determine whether "0" has been intentionally embedded in this rectangle or "0" has been inevitably embedded although "1" should have been embedded.

In view of this circumstance, when either expression 1 or 2 is satisfied, the embedding process is skipped regardless of whether bit information to be embedded is "0" or "1". Accordingly, both embedding and extracting sides of digital-watermark information can recognize the same position where digital-watermark information has been embedded.

If the determination result in step S304c in FIG. 5 is "NO", the process returns to step S304a so as to select a next target rectangle (for example, rectangle (2, 4)) in which digital-watermark information may be embedded. On the other hand, if the determination result in step S304c in FIG. 5 is "YES", information for specifying the current target rectangle (for example, rectangle (2, 2)) is stored as the rectangle in which digital-watermark information is to be embedded, and then the process proceeds to step S305. Then, the watermark embedding unit 105 in the subsequent stage embeds digital-watermark information in the rectangle.

<2-3. Algorithm for Embedding Digital-Watermark Information in an Image Document>

Figure 6:
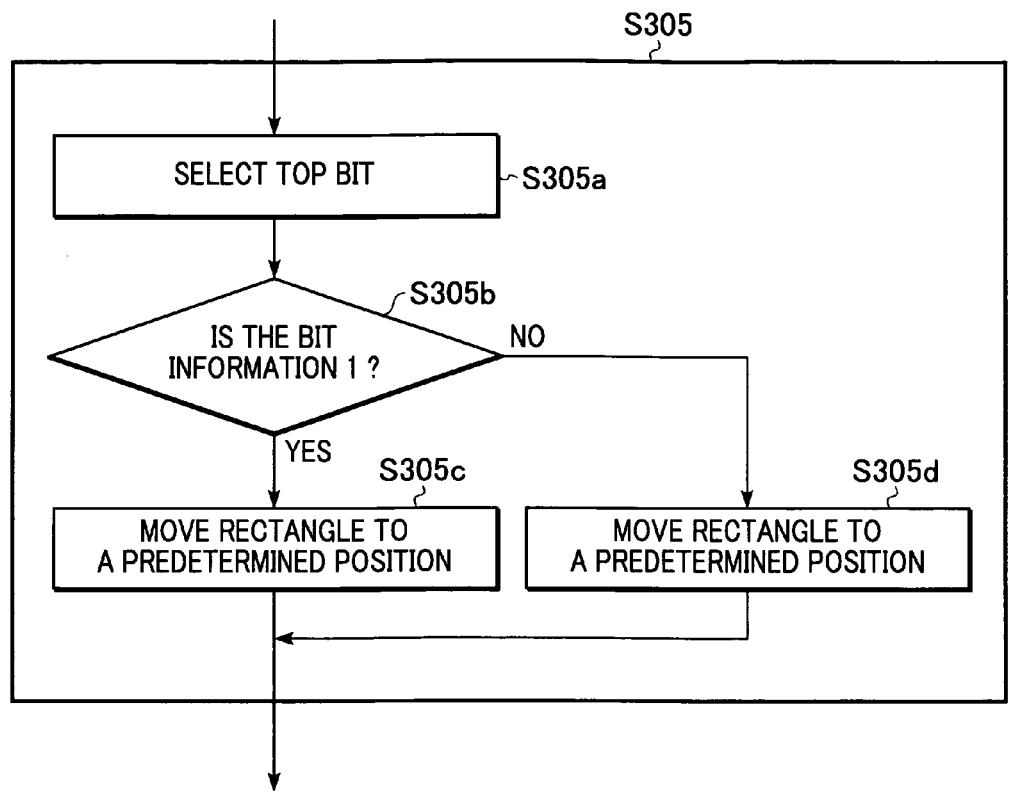
FIG. 6 is a flowchart showing a specific process of embedding digital-watermark information.

Hereinafter, the operation of the watermark embedding unit 105 in step S305 will be described. FIG. 6 is a flowchart for illustrating an example of a method for embedding digital-watermark information by using distances between a plurality of character images.

In step S305, the image data, information about the position and size of each rectangle, the determination result from the determining unit 103 (the position of characters in which digital-watermark information can be embedded), and information about the lengths between the rectangles are transmitted from the determining unit 103 to the watermark embedding unit 105.

First, in step S305a, a top 1 bit to be embedded as the digital-watermark information 104 is selected. For example, when "01001010111 . . . " is input as the digital-watermark information 104, the top bit "0" is selected.

Then, in step S305b, it is determined whether the bit information to be embedded is "1". If the bit information is "1" (YES), the process proceeds to step S305c, where the position of the target rectangle is changed so that L22>R22 is satisfied. If L22>R22 has already been satisfied, the target rectangle need not be moved. On the other hand, if the bit information is "0" (NO), the process proceeds to step S305d, where the position of the target rectangle is changed so that L22<R22 is satisfied. If L22<R22 has already been satisfied, the target rectangle need not be moved.

The position of each target rectangle may be changed in step S305c or S305d. Alternatively, the position of each target rectangle may be temporarily stored as position information (movement information), and the positions of all the target characters (rectangles) may be changed and adjusted in step S307.

In step S306, it is determined whether a currently selected 1 bit to be embedded is the last bit of the digital-watermark information 104. If so (YES), the process of embedding the digital-watermark information 104 is completed. On the other hand, if the currently selected bit is not the last bit (NO), the process returns to step S304 so as to continue the embedding process.

In step S307, image data in which the digital-watermark information 104 was embedded in step S305 is output. Alternatively, the positions of all the target characters (rectangles) are changed or adjusted based on the position information (movement information) of each target rectangle specified in step S305, so as to output image data embedded with the digital-watermark information 104.

In step S308, the image or image data embedded with the digital-watermark information 104 is output through the image output unit 106. The embedded image may be output to a printer, transmitted to a remote location via a communication network or stored on a storage device, for example.

<2-4. Reference Table>

As described above, in this embodiment, input image data (image 100) and the result generated by each unit shown in FIG. 1 (information about position and size of rectangles and lengths between rectangles) are transmitted to the subsequent stage. These pieces of information are transmitted in a form of a reference table. The reference table may be stored as shared data for each unit in the main storage device 1203 so that each unit accesses the table as necessary, or the table may be attached as additional data to the image data processed by each unit.

FIG. 13 shows an example of the reference table. In this figure, each record (each line in the table) includes pieces of information corresponding to one circumscribed rectangle. Hereinafter, each field (each column in the table) will be described. A first field stores index information for specifying each circumscribed rectangle. A second field stores coordinates (coordinates at the upper left corner of each circumscribed rectangle) of each circumscribed rectangle in the original document image. A third field stores the size (width and height) of each circumscribed rectangle.

As described above, data in the first to third fields is generated by the document analyzing unit 102 shown in FIG. 1. The document analyzing unit 102 generates records of all the character images (rectangles) included in the input document image. When the reference table is stored as shared data in the main storage device 1203, a fourth field is allocated as a data area in the main storage device 1203. On the other hand, when the reference table is attached as additional data to the image data processed by each unit, a necessary field is added when each unit processes image data.

As described above, in this embodiment, circumscribed rectangles in which digital-watermark information may be embedded are predetermined to be even-numbered rectangles in the second line and thereafter. Therefore, the determining unit 103 calculates information about the lengths (L22, R22, Sr, and Sl) related to each target rectangle, and stores the calculation result in the fourth field.

Also, the determining unit 103 determines whether digital-watermark information can be embedded in each target rectangle based on the information about the lengths, and stores the determination result as a 1-bit flag in a fifth field. For example, when the flag indicates "OK", digital-watermark information of any of "0" and "1" can be embedded in the target rectangle. The flag in the fifth field indicates "-" for a group of rectangles which cannot be embedded with digital-watermark information of any of "0" and "1" and a group of rectangles whose positions are not changed among the rectangles in which digital-watermark information may be embedded.

The watermark embedding unit 105 changes only the positions of rectangles in which the fifth field indicates "OK", based on each piece of bit information of the digital-watermark information 104. The coordinate information indicating the position of each rectangle after being moved requires only the x coordinate, because each rectangle is moved only in the horizontal direction. The coordinate of each rectangle after movement is stored in a sixth field.

In FIG. 3, steps S304 to S306 are performed for each target rectangle so as to embed digital-watermark information. Alternatively, in its modification, whether digital-watermark information can be embedded is determined for all the rectangles in which digital-watermark information can be embedded in step S304. Then, in step S305, the position information of each target rectangle may be changed.

This modification has the following merit. The number of OKs in the fifth field in the reference table shown in FIG. 13 can be counted before embedding digital-watermark information, and thus it can be determined whether all the bits of the digital-watermark information can be embedded before starting an embedding process.

That is, when the number of rectangles of "OK" is m in the determination result obtained in step S304, digital-watermark information of up to m bits can be embedded in the input image. Accordingly, by comparing the number of all the bits forming the digital-watermark information 104 with the number of "OK"s (m), the number of bits that can be embedded is immediately determined.

When it is determined that the number of rectangles in which digital-watermark information can be embedded is under m, the information processor of this embodiment notifies the user of that fact, for example, by displaying the message in a display. The user receives the notification, and selects whether to discontinue the process or to embed only those rectangles, which can be embedded.

When digital-watermark information is Japanese, for example, one character included in the information is generally regarded as 16 bits. In this case, in the above-described modification, when "the number of bits which can be embedded", which has been counted before embedding digital-watermark information, is 16×n bits+a (a is an integer of 15 or less), the last a bit under 16 bits is not embedded. That is, when all the bits forming information of one unit to be embedded cannot be embedded, the information corresponding to the one unit is not embedded.

<3. Process of Extracting Digital-Watermark Information>

Next, a process of extracting digital-watermark information from an image (process shown in FIG. 2) in this embodiment will be described with reference to the flowchart shown in FIG. 4.

First, in step S401, the document image 200 from which digital-watermark information is extracted (detected) is input through the image input unit 201 (scanner 1217 in FIG. 12), and the image input unit 201 outputs the document image 200 to the document analyzing unit 202. Herein, the document image 200 in a form of printed material is input through the scanner 1217, but any other form can be applied. For example, the document image 200 may be electronic image data created by using a document editing application program (various types of electronic data in a form peculiar to an application program or in a text form, which is stored in a storage medium connected to the HDD 1204, the CD drive 1209, the DVD drive 1210, or the FD drive 1211), the electronic image data being converted to a bitmap by image processing software or the like. Alternatively, an image file downloaded through the Internet may be used.

In step S402, the document analyzing unit 202 extracts information about each circumscribed rectangle (the position and size of each rectangle) from the input document image 200. The process performed by the document analyzing unit 202 is the same as that performed by the document analyzing unit 102 shown in FIG. 1.

Then, in step S403, the determining unit 203 determines whether digital-watermark information is actually embedded in a circumscribed rectangle from which digital-watermark information is to be extracted (detected). The determining unit 203 is the same as the determining unit 103 shown in FIG. 1.

An advantage of the present embodiment is that an identical result can be derived from the determination by the determining unit 203 in the extracting side and the determination by the determining unit 103 in the embedding side. This is because rectangles other than target rectangles having an effect on the parameters Lx, Rx, Srx, and Slx in Expressions 1 and 2, which are also applied to determination by the determining unit 203, are not moved. Therefore, even if the parameters are changed to Lx', Rx', Srx', and Slx' due to the movement of the target rectangle, the determination result for "whether or not digital-watermark information can be embedded in the target rectangle" based on Expressions 1 and 2 does not change.

For example, parameters before the target rectangle is moved are Lx, Rx, Srx, and Slx, and parameters after movement are Lx', Rx', Srx', and Slx'. In this state, the condition defined by Expression 1 can also be defined by Expression 1':

$$Lx'+Srx' \leq Rx'-Srx' \qquad \text{(Expression 1')}.$$

Further, when the amount of movement of the target rectangle is Sx, Expression 1' can also be expressed by Expression 1":

$$(Lx+Sx)+(Srx-Sx) \leq (Rx-Sx)-(Srx-Sx) \qquad \text{(Expression 1")}.$$

The determination based on Expression 1" is eventually the same as that based on Expression 1.

This can be applied to Expression 2. Therefore, if a target rectangle is determined to be "a rectangle in which digital-watermark information can be embedded" in the embedding process, that rectangle is determined to be "a rectangle in which digital-watermark information is embedded" in the extracting process.

Figure 7:
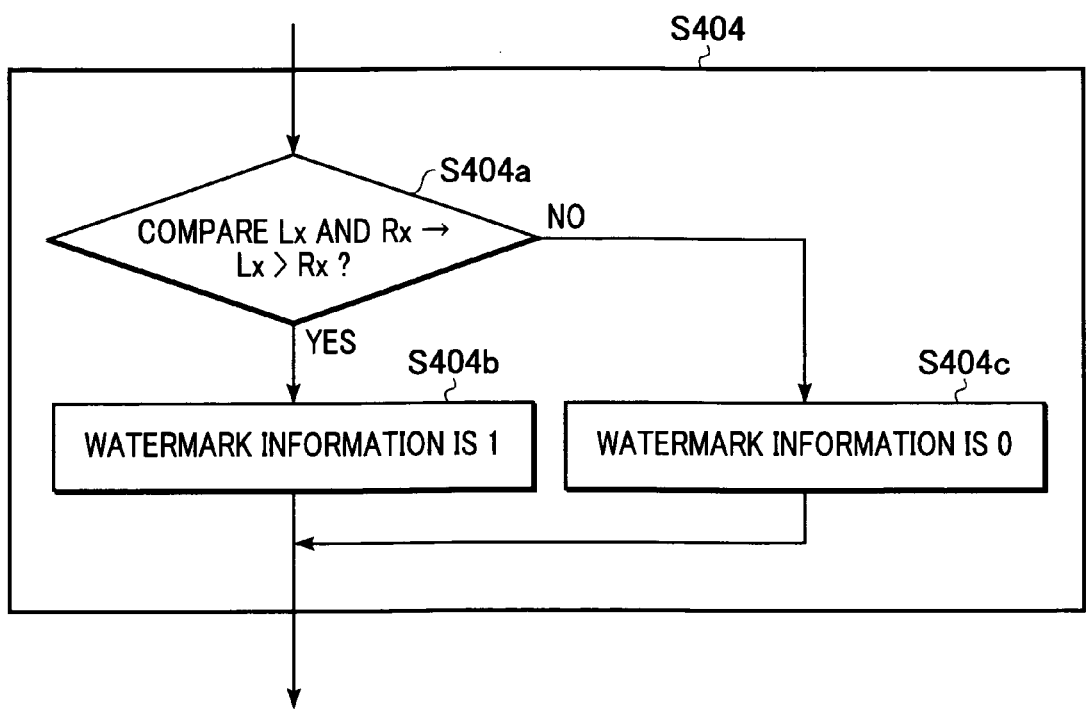
FIG. 7 is a flowchart showing a specific process of extracting digital-watermark information.

After a circumscribed rectangle from which digital-watermark information should be extracted is selected in step S403, the process proceeds to step S404, where the watermark extracting unit 204 extracts (detects) digital-watermark information. This process is performed in accordance with the flowchart shown in FIG. 7. Hereinafter, the flowchart shown in FIG. 7 will be briefly described.

First, in step S404a, the above-described two parameters Lx and Rx of the target rectangle from which digital-watermark information should be extracted are compared. If Lx>Rx, the process proceeds to step S404b, where it is determined that the digital-watermark information (bit information) embedded in the input image is "1". On the other hand, if Lx<Rx, the process proceeds to step S404c, where it is determined that the digital-watermark information (bit information) is "0".

In step S405, it is determined whether the currently-selected circumscribed rectangle is the last rectangle in the document image. If the rectangle is the last one, the process is completed. If the rectangle is not the last one, the process returns to step S403 so as to continue the extracting process.

As described above, according to this embodiment, a position (rectangle) in which digital-watermark information could not be embedded in the embedding side can be recognized by the extracting side by using the identical determination condition as in the embedding side. Therefore, extracted positions can be precisely determined and digital-watermark information can be reliably extracted.

<Modification 1>

Figure 9:
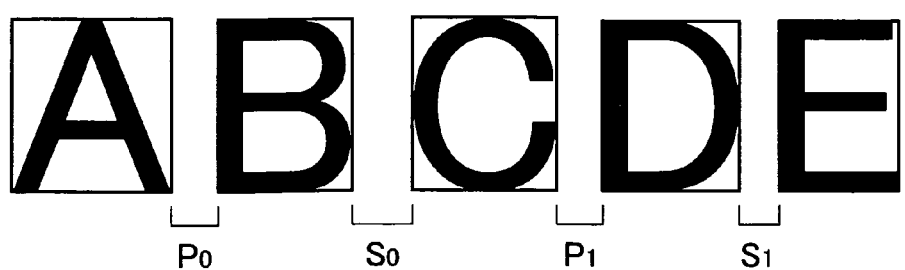
FIG. 9 shows an image in which digital-watermark information is to be embedded.
Figure 10:
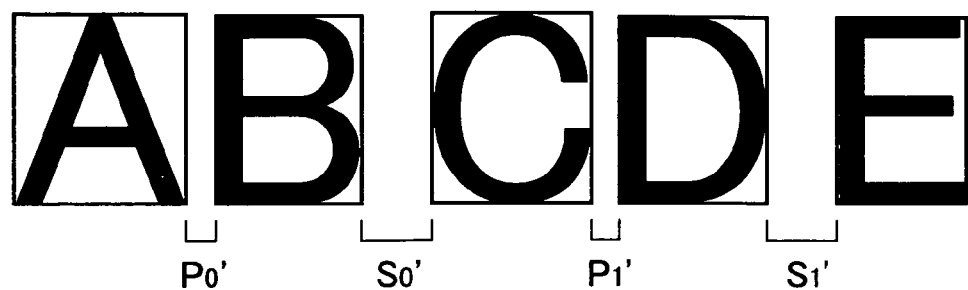
FIG. 10 shows an image in which digital-watermark information has been embedded.
Figure 11:
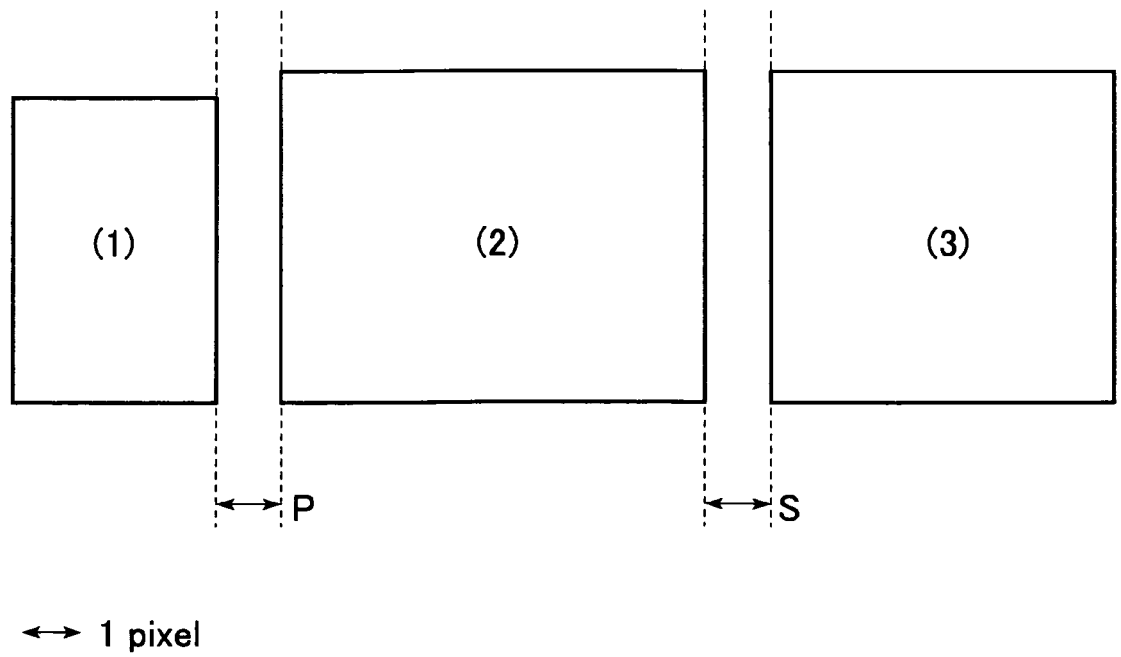
FIG. 11 illustrates an example in which digital-watermark information cannot be embedded.

In this modification, the concept in the above-described embodiment is applied to the algorithms of embedding and extracting digital-watermark information shown in FIGS. 9 and 10. The configuration required for each process and the procedure are similar to the above-described embodiment of FIGS. 1 to 7 and discussion of such similarities will be omitted.

In the algorithm of embedding digital-watermark information shown in FIGS. 9 and 10, a determination condition used in the determining unit 103 can be defined, as in the above-described embodiment.

First, conditions where bit information "0" or "1" cannot be embedded in a target rectangle (character) will be described. The distance between a target rectangle and the rectangle on its immediate left is P, and the distance between the target rectangle and the rectangle on its immediate right is S. In this modification, bit information "1" cannot be embedded in the target rectangle if P<S even if the target rectangle is moved in the right direction to the maximum extent, that is, when the following Expression is satisfied:

$$S \leq 1 \text{ and } P \leq S \qquad \text{(Expression 3)}.$$

On the other hand, "0" cannot be embedded if P>S even if the target rectangle is moved in the left direction to the maximum extent, that is, when the following Expression is satisfied:

$$P \leq 1 \text{ and } P \geq S \qquad \text{(Expression 4)}.$$

When any one of Expressions 3 and 4 is satisfied, digital-watermark information is not embedded in the target rectangle. Expression 3 can be transformed to $P \leq S \leq 1$, and Expression 4 can be transformed to $S \leq P \leq 1$. That is, information is not embedded if $P \leq S \leq 1$ or if $S \leq P \leq 1$.

The two conditional Expressions have the same meaning as S=P=1, if each of P and S is a natural number without exception. Therefore, a condition where digital-watermark information is not embedded in the target rectangle can be easily represented by the following Expression:

$$S=1 \text{ and } P=1 \qquad \text{(Expression 5)}.$$

The truth-value of the condition of Expression 5 is the same at both embedding and extraction, which will be described below. First, if digital-watermark information has not been embedded in the embedding side (if embedding process has been skipped), Expression 5 is satisfied. In this case, the target rectangle has not been moved, and thus P=S is satisfied in the extracting side. Therefore, Expression 5 is satisfied also in the extracting side, and thus the extracting process is skipped in the extracting side.

Second, if digital-watermark information has been embedded in the embedding side (if embedding process has not been skipped), Expression 5 is not satisfied. That is, S>1 and P>1, S=1 and P>1, or S>1 and P=0. When digital-watermark information is embedded, the target rectangle is moved so that P>0 and S>0 is satisfied. Therefore, even if the target rectangle is moved in any of these three states, P'=1 and S'=1 cannot be satisfied. Accordingly, Expression 5 is not satisfied on the extracting side, and it is therefore determined that digital-watermark information is embedded.

<Modification 2>

In the above-described embodiment, Srx is defined as a maximum movement amount in the right direction and Slx is defined as a maximum movement amount in the left direction. Alternatively, the maximum movement amount may be independently determined so that the quality of a document image is not degraded over an allowable range, and conditional expressions equivalent to Expressions 1 and 2 may be defined. In the above-described embodiment, the minimum distance between adjoining rectangles corresponds to one pixel. Here, in modification 2, however, conditional expressions are set so that the minimum distance corresponds to several pixels. For example, when minimum space (margin) required between adjoining rectangles is defined as M, Expression 1 can be transformed to Expression 6, and Expression 2 can be transformed to Expression 7.

$$Lx+(Srx-M) \leq Rx-(Srx-M) \quad \text{(Expression 6)}$$

$$Lx-(Slx-M) \geq Rx+(Slx-M) \quad \text{(Expression 7)}$$

By using these Expressions, digital-watermark information can be embedded in an input image without causing a significant degradation in the image quality, for example, the distance between two characters is extremely short. Hereinafter, a method for applying Expressions 6 and 7 to the above-described embodiment will be described.

In step S304 in FIG. 3, Expressions 6 and 7 are applied to conditions for determining whether digital-watermark information can be embedded. Then, in accordance with the determination in step S304, the embedding step illustrated in FIG. 6 is performed only for target rectangles in which "1" and "0" can be reliably embedded while the distance (margin) between adjoining characters (rectangles) can be kept at the minimum distance M or more.

Figure 4:
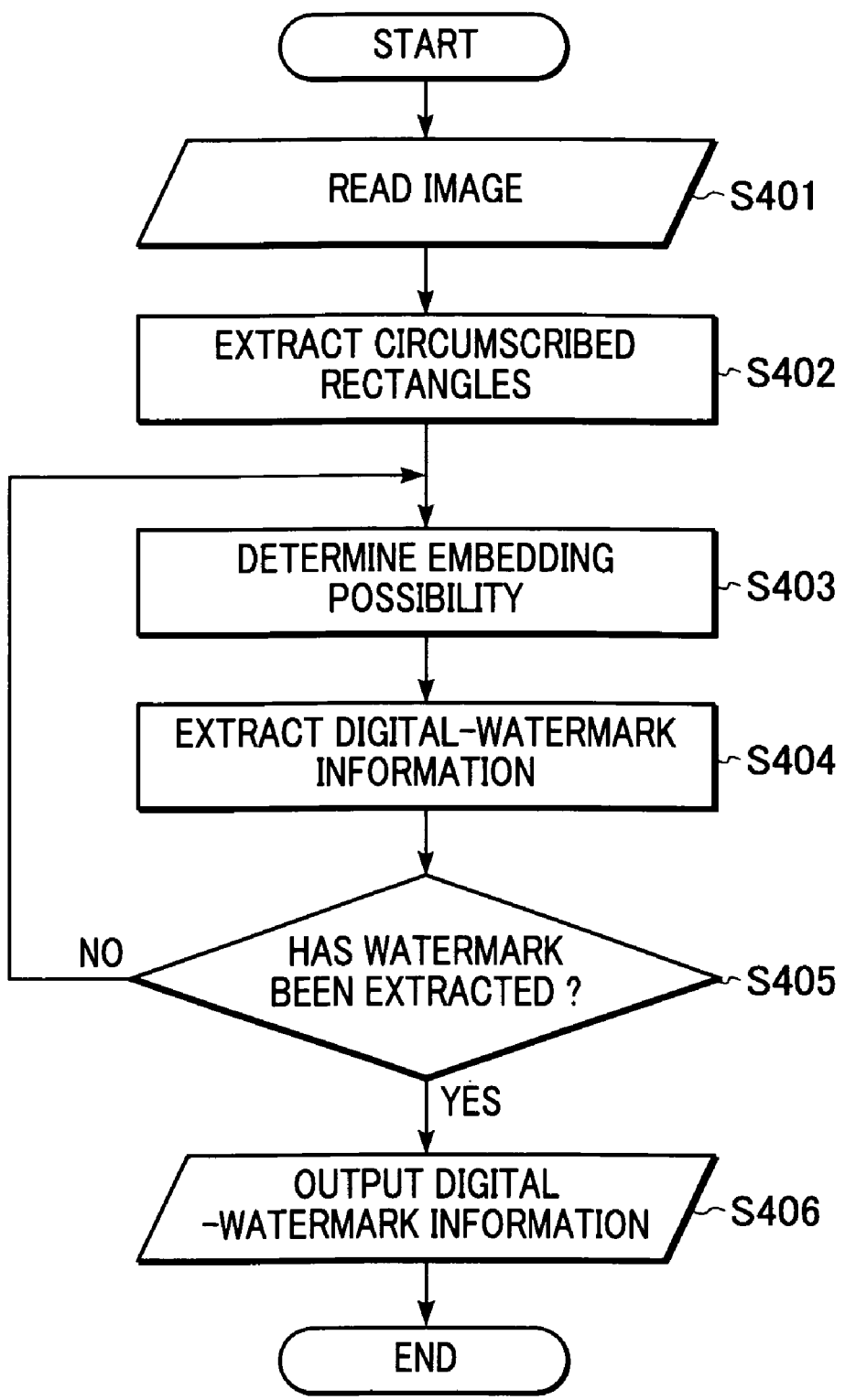
FIG. 4 is a flowchart showing the process of extracting digital-watermark information.

On the other hand, for extraction, Expressions 6 and 7 are applied to determine whether digital-watermark information is embedded in the determining step S403 in FIG. 4. After the determination, digital-watermark information "1" and "0" are extracted from the target rectangles which have been determined as rectangles in which watermark is embedded. The extracting method is the same as in the above-described embodiment.

As described above, by providing a margin of one pixel or more between characters, degradation in the quality of image embedded with digital-watermark information can be minimized.

<Modification 3>

In the above-described embodiment and modifications 1 and 2, watermark can be embedded if the difference between Lx and Rx is one pixel or more. In this modification, the difference is set at a predetermined value T or more.

In order to increase the possibility of reliably extracting digital-watermark information, that is, the robustness to attack of digital-watermark information, the difference between Lx and Rx has to be increased. If the difference between Lx and Rx is large enough, digital-watermark information can be extracted even if some changes are applied between characters in the image 200 shown in FIG. 2. This purpose cannot be achieved when a predetermined large difference between Lx and Rx cannot be obtained even if a target rectangle is moved to the maximum extent in both right and left directions. Accordingly, it is effective to transform Expression 1 to Expression 8 and transform Expression 2 to Expression 9.

$$Lx+Srx-T \leq Rx-Srx \quad \text{(Expression 8)}$$

$$Lx-Slx+T \geq Rx+Slx \quad \text{(Expression 9)}$$

In these Expressions, T is a minimum differential value, which is allowable as the difference between Lx and Rx adjusted for embedding digital-watermark information. Hereinafter, a method for applying Expressions 8 and 9 to the above-described embodiment will be briefly described.

In step S304 in FIG. 3, Expressions 8 and 9 are applied to conditions for determining whether digital-watermark information can be embedded. Then, in accordance with the determination in step S304, the embedding step illustrated in FIG. 6 is performed only for the target rectangles in which the difference between Lx and Rx can be set at the predetermined value T or more by being moved to the maximum extent.

In this modification, when "1" is embedded in step S305c of FIG. 6, the position of the target rectangle is changed so that Lx'−Rx'>T is satisfied. Also, when "0" is embedded in step S305d, the position of the target rectangle is changed so that Rx'−Lx'>T is satisfied.

On the other hand, when digital-watermark information is extracted, Expressions 8 and 9 are applied to conditions for determining whether digital-watermark information is embedded in step S403 in FIG. 4. After the determination, digital-watermark information "1" and "0" are extracted from the target rectangles which have been determined as rectangles in which watermark is embedded. The extracting method is the same as in the above-described embodiment.

<Modification 4>

One function of Modification 2 is that it is designed for preventing degradation in the image quality and one function of modification 3 is that it is designed for increasing robustness. Generally, in the digital-watermark technique, three parameters: image quality; robustness; and the amount of information, which can be embedded, are in a tradeoff relationship. That is, when degradation in the image quality is suppressed, the amount of information that can be embedded is reduced and the robustness is also reduced. When the robustness is increased, the amount of information that can be embedded is reduced and the image quality is significantly degraded. Therefore, each parameter should be adequately set. In this modification, both image quality and robustness can be controlled at the same time.

In this modification, Expression 1 is transformed to Expression 10, and Expression 2 is transformed to Expression 11.

$$Lx-T+(Srx-M) \leq Rx-(Srx-M) \quad \text{(Expression 10)}$$

$$Lx+T-(Slx-M) \geq Rx+(Slx-M) \quad \text{(Expression 11)}$$

Hereinafter, a method for applying Expressions 10 and 11 to the above-described embodiment will be briefly described.

In step S304 in FIG. 3, Expressions 10 and 11 are applied to conditions for determining whether digital-watermark information can be embedded. Then, in accordance with the determination in step S304, the embedding step illustrated in FIG. 6 is performed only for the target rectangles in which "1" and "0" can be reliably embedded while keeping the distance (margin) between adjoining characters (rectangles) at the minimum distance M or more and the difference between Lx and Rx can be set at the predetermined value T or more by moving the target rectangle to the maximum extent.

In this modification, when "1" is embedded in step S305c in FIG. 6, the position of the target rectangle is changed so that Lx'−Rx'>T is satisfied. Also, when "0" is embedded in step S305d, the position of the target rectangle is changed so that Rx'−Lx'>T is satisfied.

On the other hand, when digital-watermark information is extracted, Expressions 10 and 11 are applied to conditions for determining whether digital-watermark information is embedded in step S403 in FIG. 4. After the determination, digital-watermark information "1" and "0" are extracted from the target rectangles having embedded watermark information. The extracting method is similar to the above-described embodiment.

<Modification 5>

In modification 4, as exemplary functionality, digital-watermark information is embedded in a document image based on expressions 10 and 11 while maintaining the desired image quality and robustness. When such a determination is performed, in certain instances, target rectangles may be determined as rectangles in which watermark cannot be embedded. As a result, the amount of information that can be embedded is very small. Therefore, in this modification, the determination standard and embedding method are modified to allow more information to be embedded. In this modification, the determination standard and embedding method are changed depending on which of image quality and robustness is preceded. Hereinafter, each case will be described.

<Image-Quality Priority>

Figure 14:
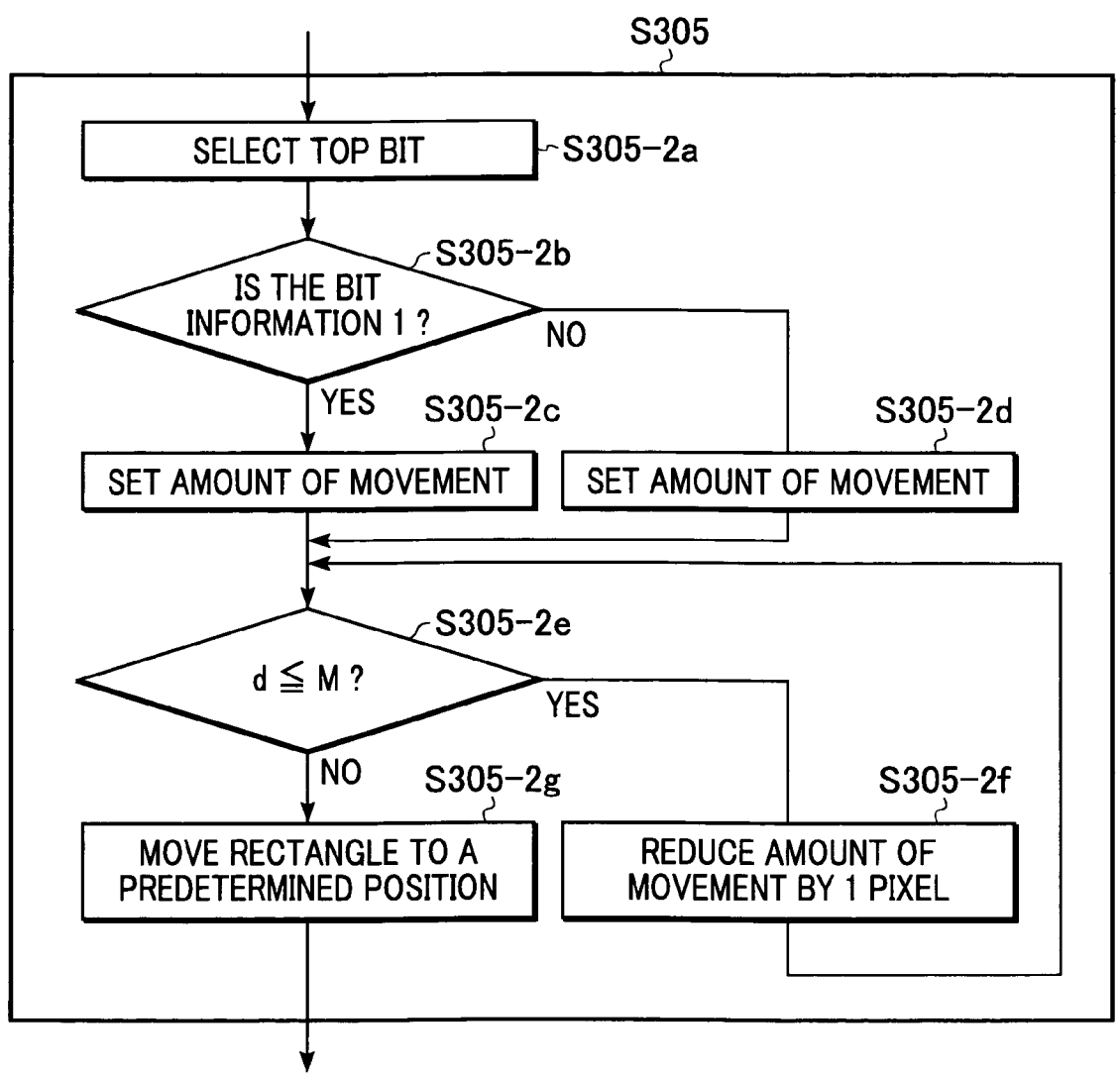
FIG. 14 is a flowchart showing a specific process of embedding digital-watermark information.

First, a case where emphasis is placed on the image quality will be described. In this case, FIGS. 1 to 5 and 7 are applied, and FIG. 14 is applied instead of FIG. 6.

In step S304 in FIG. 3, it is determined whether digital-watermark information can be embedded by using Expressions 6 and 7, as in modification 2. Then, in accordance with the determination, the embedding step S305 (described later) is performed for the target rectangles which have been determined to be rectangles in which "1" and "0" can be reliably embedded while keeping the distance (margin) between adjoining characters (rectangles) at the minimum distance M or more.

The term "Shift" is the amount of movement used for embedding digital-watermark information for associating Lx and Rx before movement with Lx' and Rx' after movement as:

$Lx'=Lx+\text{Shift}$ $Rx'=Rx-\text{Shift}$.

The amount of movement is a one-dimensional vector, and the amount of movement in the right direction is regarded as positive and that in the left direction is regarded as negative.

In the following description, the amount of movement is increased or decreased. An increase in the amount of movement shows an increase in the vector. For example, +3+1=+4, and −3+1=−4. Likewise, a decrease in the amount of movement shows a decrease in the vector, but the direction of movement must not be reversed. That is, "+3−4=−1" or "−3−4=+1" is impossible.

FIG. 14 shows the details of step S305 in FIG. 3. First, in step S305-2a, a top one bit to be embedded as the digital-watermark information 104 is selected. For example, when "01001010111 . . . " is input as the digital-watermark information 104, the top bit "0" is selected. Then, in step S305-2b, it is determined whether the bit information to be embedded is "1".

If the bit information is "1" (YES), the process proceeds to step S305-2c so as to calculate the amount of movement Shift=(R−L)/2+(T+1)/2 in the right direction (positive) for changing the position of the target rectangle so that Lx'−Rx'>T is satisfied, and the amount of movement is stored. If Lx'−Rx'>T has already been satisfied, the target rectangle need not be moved, so that Shift=0.

If the bit information is "0" (NO), the process proceeds to step S305-2d so as to calculate the amount of movement Shift=−(L−R)/2−(T+1)/2 in the left direction (negative) for changing the position of the target rectangle so that Rx'−Lx'>T is satisfied, and the amount of movement is stored. If Rx'−Lx'>T has already been satisfied, the target rectangle need not be moved, so that Shift=0.

Then, in step S305-2e, the distances between the target rectangle and rectangles on both sides are calculated, and the shorter distance is defined as d. Then, it is determined whether d≦M is satisfied.

If d≦M is satisfied (YES), the process proceeds to step S305-2f so as to decrease the amount of movement "Shift" by 1. Accordingly, the direction of movement of the target rectangle is reversed, that is, the rectangle moving to the right so as to embed "1" is moved to the left, or the rectangle moving to the left so as to embed "0" is moved to the right. That is, in step S305-2e, if the distance d is lower than the margin M, which is required for maintaining image quality, the amount of movement "Shift" is reduced as much as possible in order to improve the visual image quality in the vicinity of the target rectangle (character). In other words, the above-described robustness is adequately reduced.

On the other hand, if d>M is satisfied (NO), the process proceeds to step S305-2g so as to actually move the target rectangle in accordance with the amount of movement "Shift". That is, digital-watermark information is actually embedded in step S305-2g. After that, the process proceeds to step S306 in FIG. 3. Step S306 is the same as that described above.

When digital-watermark information is extracted, Expressions 6 and 7 are applied to conditions for determining whether digital-watermark information is embedded in step S403 in FIG. 4. After the determination, digital-watermark information "1" and "0" are extracted from the target rectangles which have been determined as rectangles in which watermark is embedded. The extracting method is the same as in the above-described embodiment.

<Robustness Priority>

Next, an aspect, which places high priority on robustness will be discussed with reference to FIGS. 1-5, 7 and 15.

In step S304 in FIG. 3, it is determined whether digital-watermark information can be embedded by using Expressions 8 and 9, as in modification 3. Then, in accordance with the determination, the embedding step S305 (described later) is performed for the target rectangles which have been determined to be rectangles in which the difference between Lx and Rx can be set at the predetermined value T or more by being moved to the maximum extent.

Figure 15:
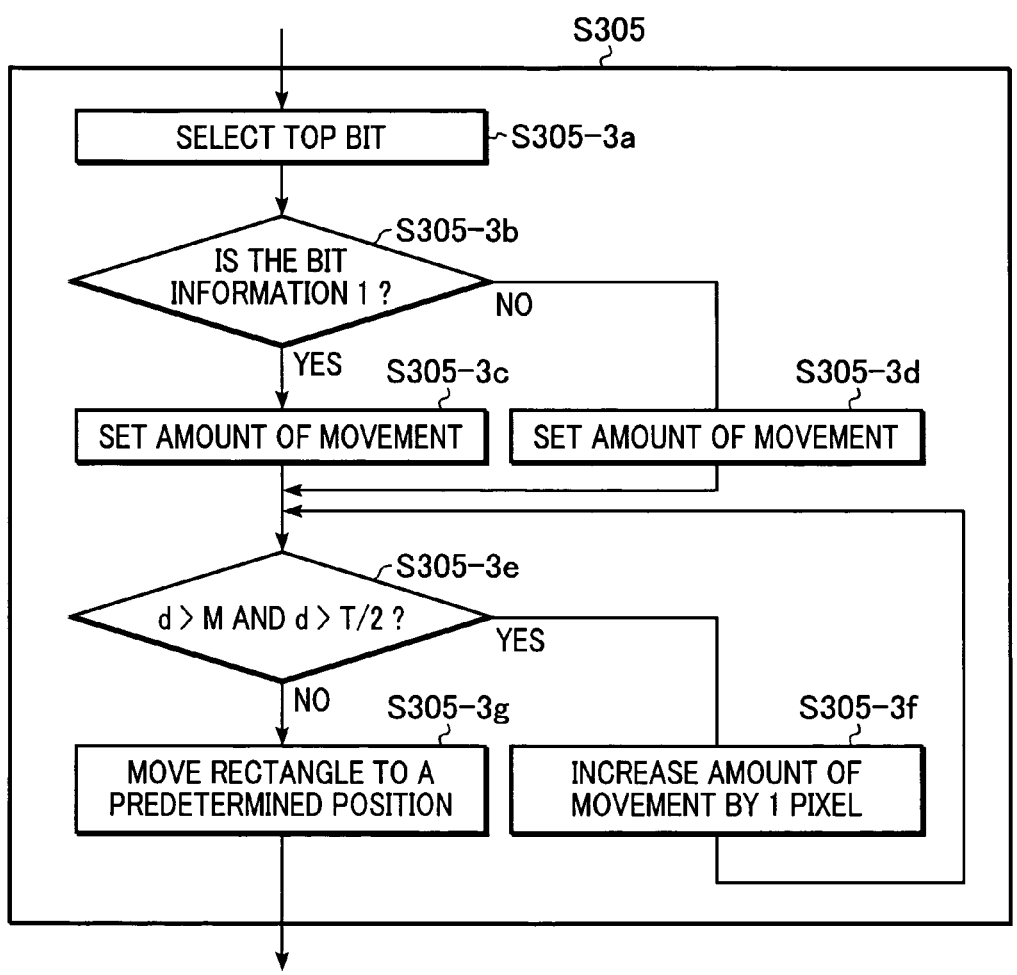
FIG. 15 is a flowchart showing a specific process of embedding digital-watermark information.

FIG. 15 shows the details of step S305 in FIG. 3. First, in step S305-3a, the top 1 bit which is to be embedded as the digital-watermark information 104 is selected. For example, when "01001010111 . . . " is input as the digital-watermark information 104, the top bit "0" is selected. Then, in step S305-3b, it is determined whether the bit information to be embedded is "1".

If the bit information is "1" (YES), the process proceeds to step S305-3c so as to calculate the amount of movement Shift=(R−L)/2+(T+1)/2 in the right direction (positive) for changing the position of the target rectangle so that $Lx'-Rx'>T$ is satisfied, and the amount of movement is stored. If $Lx'-Rx'>T$ has already been satisfied, the target rectangle need not be moved, so that Shift=0.

If the bit information is "0" (NO), the process proceeds to step S305-3d so as to calculate the amount of movement Shift=−(L−R)/2−(T+1)/2 in the left direction (negative) for changing the position of the target rectangle so that $Rx'-Lx'>T$ is satisfied, and the amount of movement is stored. If $Rx'-Lx'>T$ has already been satisfied, the target rectangle need not be moved, so that Shift=0.

Then, in step S305-3e, the distances between the target rectangle and rectangles on both sides are calculated, and the shorter distance is defined as d. Then, it is determined whether d>M and d>T/2 is satisfied.

If d>M and d>T/2 is satisfied (YES), the process proceeds to step S305-3f so as to increase the amount of movement "Shift" by 1. Accordingly, the rectangle moving to the right so as to embed "1" is moved to the right, or the rectangle moving to the left so as to embed "0" is moved to the left, that is, the rectangle moves in the same direction as the initially set Shift. That is, if d is larger than the margin M, which is required for maintaining image quality, the range of Shift is increased so as to embed digital-watermark information as strongly as possible. Accordingly, robustness is increased.

In order to prevent determination "embedding is impossible" based on Expressions 8 and 9 in the extracting side due to excessive movement in a single direction, d must be equal to or less than T/2 after digital-watermark information has been embedded.

If $d \leq M$ or $d \leq T/2$ is satisfied (NO), the process proceeds to step S305-3g so as to actually move the target rectangle by using the amount of movement "Shift". Then, the process proceeds to step S306 in FIG. 3. Step S306 is the same as that described above.

When digital-watermark information is extracted, Expressions 8 and 9 are applied to conditions for determining whether digital-watermark information is embedded in step S403 in FIG. 4. After the determination, digital-watermark information "1" and "0" are extracted from the target rectangles which have been determined as rectangles in which watermark is embedded. The extracting method is the same as in the above-described embodiment. By performing the above-described processes, the amount of information, which can be embedded, can be adjusted.

The functions of the above-described embodiments can be realized by a computer based on a computer program, and thus the computer program is included in the scope of the present invention. Also, the computer program is usually stored in a computer-readable storage medium, such as a CD-ROM, and can be executed by copying it or installing it in the computer. Therefore, the computer-readable storage medium is included in the scope of the present invention.

In the above-described embodiments, a process of embedding digital-watermark information is performed for image data input through an input system such as a scanner. Alternatively, the embedding function may be incorporated into a printer driver, and the embedding process may be performed for image data output through the process by the driver.

The function of embedding digital-watermark information can be incorporated into a printer driver, which directs an application program such as a document editing processor or the like, and a character pattern can be generated based on a character code, font, size, and position given by this program. Then, in the generated character pattern, each target character (rectangle) is slightly moved in the manner of the above-described embodiment based on the prepared digital-watermark information 104 (the digital-watermark information 104 may be input through a keyboard or the like at printing), so as to embed digital-watermark information.

As described above, according to the present invention, the embedding side and the extracting side of digital-watermark information can recognize the identical position in which digital-watermark information has been embedded.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing method for embedding digital-watermark information by moving target characters in a character string, the method comprising:

a determining step of determining whether a predetermined distance between each target character and an adjoining character can be maintained if digital-watermark information is embedded in the target character;

a setting step of setting the target character as an object which is to be embedded with digital-watermark information if the determining step determines that the predetermined distance can be maintained, and setting the target character as an object which is not to be embedded with digital-watermark information if the determining step determines that the predetermined distance cannot be maintained; and an adjusting step of adjusting the position of the target character set as an object which is to be embedded with digital-watermark information in the setting step, based on the digital-watermark information.

2. A method according to claim 1, further comprising an extracting step of extracting digital-watermark information from the target character set as an object embedded with digital-watermark information.

3. A method according to claim 2, wherein the extracting step identifies the target character as an object embedded with digital-watermark information by determining whether the predetermined distance between the target character and the adjoining character is maintained.

4. A method according to claim 3, wherein information which may be embedded in each target character is 1-bit information indicating 0 or 1.

5. A method according to claim 3, wherein the predetermined distance corresponds to one pixel.

6. A method according to claim 3, wherein the predetermined distance corresponds to a plurality of pixels.

7. An information processor for embedding digital-watermark information by moving target characters in a character string arranged in a predetermined direction to the predetermined direction, the information processor comprising:

determining means for determining whether a predetermined distance between each target character and an adjoining character can be maintained if any digital-watermark information which may be embedded in the target character is actually embedded;

setting means for setting the target character as an object which is to be embedded with digital-watermark information if the determining means determines that the predetermined distance can be maintained, and setting the target character as an object which is not to be embedded with digital-watermark information if the determining means determines that the predetermined distance cannot be maintained; and adjusting means for adjusting the position of the target character set as an object which is to be embedded with digital-watermark information by the setting means, based on the digital-watermark information.

8. An information processing program stored on a computer readable medium for embedding digital-watermark information, the program comprising:

a determining step of determining whether a predetermined distance between each target character and an adjoining character can be maintained if any digital-watermark information which may be embedded in the target character is actually embedded;

a setting step of setting the target character as an object which is to be embedded with digital-watermark information if the determining step determines that the predetermined distance can be maintained, and setting the target character as an object which is not to be embedded with digital-watermark information if the determining step determines that the predetermined distance cannot be maintained; and an adjusting step of adjusting the position of the target character set as an object which is to be embedded with digital-watermark information in the setting step, based on the digital-watermark information.

9. An information processing method for extracting digital-watermark information, which has been embedded by moving target characters in a character string arranged in a predetermined direction to the predetermined direction, from the character string, the method comprising:

a determining step of determining whether a predetermined distance between each target character and an adjoining character can be maintained if any digital-watermark information which may be embedded in the target character is actually embedded;

a setting step of setting the target character as an object which is embedded with digital-watermark information if the determining step determines that the predetermined distance can be maintained, and setting the target character as an object which is not embedded with digital-watermark information if the determining step determines that the predetermined distance cannot be maintained; and an extracting step of extracting digital-watermark information from only characters set as an object embedded with digital-watermark information in the setting step.

10. A method according to claim 9, wherein information which may be embedded in each target character is 1-bit information indicating 0 or 1.

11. A method according to claim 9, wherein the predetermined distance corresponds to one pixel.

12. A method according to claim 9, wherein the predetermined distance corresponds to a plurality of pixels.

13. An information processor for extracting digital-watermark information, the information processor comprising:

determining means for determining whether a predetermined distance between each target character and an adjoining character can be maintained if digital-watermark information is actually embedded;

setting means for setting the target character as an object which is embedded with digital-watermark information if the determining means determines that the predetermined distance can be maintained, and setting the target character as an object which is not embedded with digital-watermark information if the determining means determines that the predetermined distance cannot be maintained; and extracting means for extracting digital-watermark information from characters set as an object embedded with digital-watermark information by the setting means.

14. An information processing program stored on a computer readable medium for extracting digital-watermark information, which has been embedded by moving target characters in a character string arranged in a predetermined direction to the predetermined direction, from the character string, the program comprising:

a determining step of determining whether a predetermined distance between each target character and an adjoining character can be maintained if any digital-watermark information which may be embedded in the target character is actually embedded;

a setting step of setting the target character as an object which is embedded with digital-watermark information if the determining step determines that the predetermined distance can be maintained, and setting the target character as an object which is not embedded with digital-watermark information if the determining step determines that the predetermined distance cannot be maintained; and an extracting step of extracting digital-watermark information from only characters set as an object embedded with digital-watermark information in the setting step.

* * * * *